(12) United States Patent
Gabriel et al.

(10) Patent No.: US 11,651,192 B2
(45) Date of Patent: May 16, 2023

(54) COMPRESSED CONVOLUTIONAL NEURAL NETWORK MODELS

(71) Applicant: Apple Inc., Cupertino, CA (US)

(72) Inventors: James C. Gabriel, Seattle, WA (US); Mohammad Rastegari, Bothell, WA (US); Hessam Bagherinezhad, Seattle, WA (US); Saman Naderiparizi, Seattle, WA (US); Anish Prabhu, Seattle, WA (US); Sophie Lebrecht, Seattle, WA (US); Jonathan Gelsey, Mercer Island, WA (US); Sayyed Karen Khatamifard, Seattle, WA (US); Andrew L. Chronister, Seattle, WA (US); David Bakin, Seattle, WA (US); Andrew Z. Luo, Redmond, WA (US)

(73) Assignee: Apple Inc., Cupertino, CA (US)

( * ) Notice: Subject to any disclaimer, the term of this patent is extended or adjusted under 35 U.S.C. 154(b) by 275 days.

(21) Appl. No.: 16/788,261

(22) Filed: Feb. 11, 2020

(65) Prior Publication Data

US 2020/0257960 A1    Aug. 13, 2020

Related U.S. Application Data

(60) Provisional application No. 62/804,684, filed on Feb. 12, 2019, provisional application No. 62/804,744, filed on Feb. 12, 2019.

(51) Int. Cl.
*G06N 3/04* (2006.01)
*G06N 3/08* (2006.01)

(52) U.S. Cl.
CPC .......... *G06N 3/04* (2013.01); *G06N 3/08* (2013.01)

(58) Field of Classification Search
CPC .......... G06N 3/04; G06N 3/08; G06N 3/0445; G06N 3/063; G06N 3/084; G06N 3/0454
See application file for complete search history.

(56) References Cited

U.S. PATENT DOCUMENTS

| | | | | |
|---|---|---|---|---|
| 11,080,046 | B2* | 8/2021 | Kaul | G06F 7/483 |
| 11,157,814 | B2* | 10/2021 | Howard | G06N 3/04 |
| 11,315,016 | B2* | 4/2022 | Sundaram | G06N 3/084 |
| 11,321,865 | B1* | 5/2022 | Kim | G06V 40/19 |
| 2019/0236440 | A1* | 8/2019 | Ho | G06N 3/0481 |
| 2020/0257960 | A1* | 8/2020 | Gabriel | G06N 3/08 |
| 2021/0158308 | A1* | 5/2021 | Armstrong | G06T 7/0008 |
| 2022/0121909 | A1* | 4/2022 | Zhang | G06N 3/0472 |

\* cited by examiner

*Primary Examiner* — Thien Nguyen
(74) *Attorney, Agent, or Firm* — BakerHostetler

(57) ABSTRACT

Systems and processes for training and compressing a convolutional neural network model include the use of quantization and layer fusion. Quantized training data is passed through a convolutional layer of a neural network model to generate convolutional results during a first iteration of training the neural network model. The convolutional results are passed through a batch normalization layer of the neural network model to update normalization parameters of the batch normalization layer. The convolutional layer is fused with the batch normalization layer to generate a first fused layer and the fused parameters of the fused layer are quantized. The quantized training data is passed through the fused layer using the quantized fused parameters to generate output data, which may be quantized for a subsequent layer in the training iteration.

20 Claims, 10 Drawing Sheets

COMPRESSED CONVOLUTIONAL NEURAL NETWORK MODELS

CROSS-REFERENCE TO RELATED APPLICATIONS

The present application claims the benefit of U.S. Provisional Application No. 62/804,684, titled "Integrating Fusion and Quantization in Building a Compressed Convolutional Neural Network Model" and filed on Feb. 12, 2019, and U.S. Provisional Application No. 62/804,744, titled "Use Cases for Compressed AI Model" and filed on Feb. 12, 2019, both of which are hereby incorporated by reference in their entirety for all purposes.

TECHNICAL FIELD

The present description generally relates to developing convolutional neural networks.

BACKGROUND

Convolutional neural networks are being developed for use in a variety of technical fields to perform complex tasks such as image classification, video analytics, and natural language processing.

BRIEF DESCRIPTION OF THE DRAWINGS

Certain features of the subject technology are set forth in the appended claims. However, for purpose of explanation, several aspects of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A convolutional neural network (CNN) model may be designed as a deep learning tool capable of complex tasks such as image classification and natural language processing. CNN models typically receive input data in a floating point number format and perform floating point operations on the data as the data progresses through different layers of the CNN model. Floating point operations are relatively inefficient with respect to power consumed, memory usage and processor usage. These inefficiencies limit the computing platforms on which CNN models can be deployed. For example, field-programmable gate arrays (FPGA) may not include dedicated floating point modules for performing floating point operations and may have limited memory bandwidth that would be inefficient working with 32-bit floating point numbers.

As described in further detail below, the subject technology includes systems and processes for building a compressed CNN model suitable for deployment on different types of computing platforms having different processing, power and memory capabilities. The subject technology utilizes a combination of quantization and layer fusion while training a CNN model to compress the CNN model and improve the efficiency of the model when deployed on a computing platform. According to aspects of the subject technology, input data as well as weights and parameters of layers within the CNN may be quantized from a floating point number format to a fixed point number format to reduce memory requirements and simplify data operations by removing floating point operations, for example. In addition, convolutional layers within the CNN may be fused to respective batch normalization layers to simplify the processing performed within the layers such as by removing division operations, for example.

Figure 1:
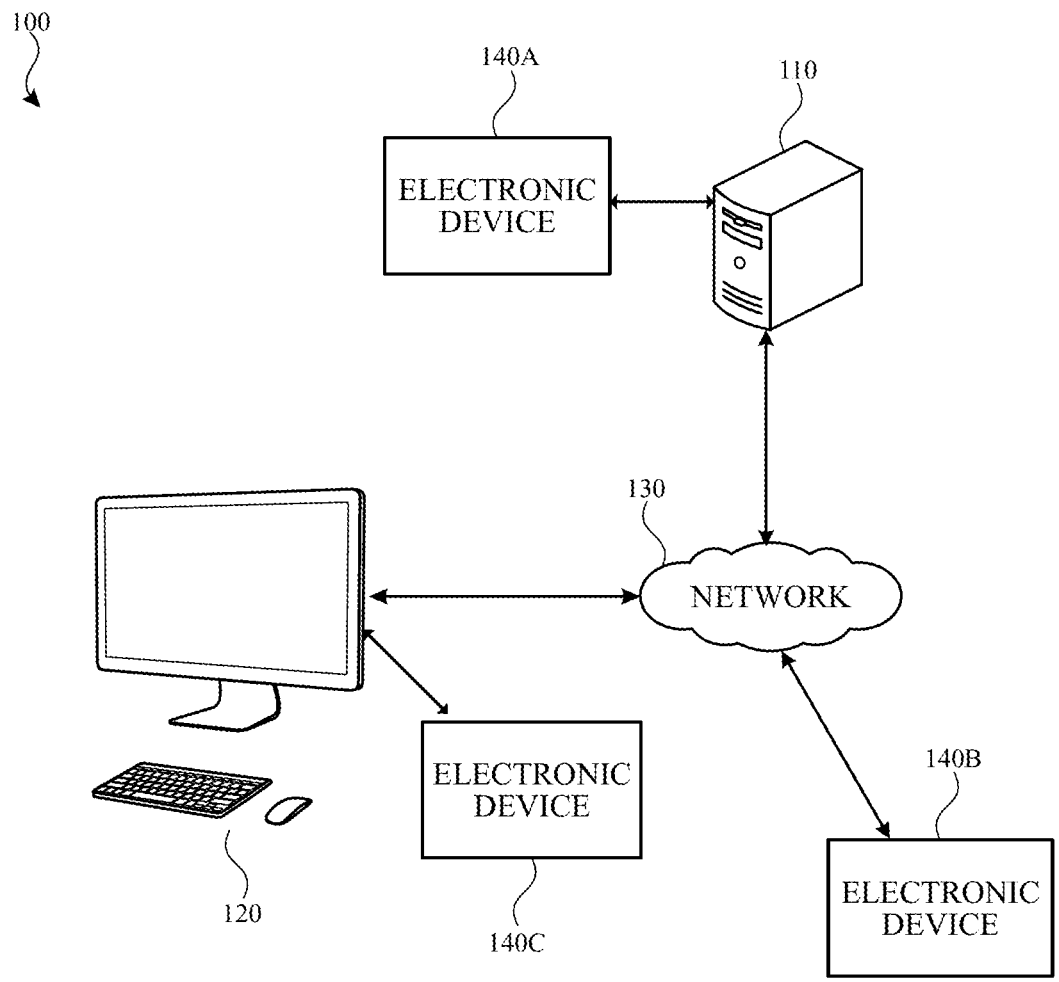
FIG. 1 illustrates an example network environment according to aspects of the subject technology.

FIG. 1 illustrates an example network environment 100 according to aspects of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes server 110, computing device 120, and electronic devices 140A-140C. Network 106 may communicatively (directly or indirectly) couple server 110 and computing device 120. Network 106 is not limited to any particular type of network, network topology, or network media. Network 106 may be a local area network or a wide area network. Network 106 may be an interconnected network of devices that may include, or may be communicatively coupled to, the Internet. For explanatory purposes, the network environment 100 is illustrated in FIG. 1 as including the server 110 and the electronic device 120. However, the network environment 100 may include any number of electronic devices and any number of servers. Server 110 and computing device 120 may include all or part of the components of the system described below with respect to FIG. 11. Electronic devices 140A-140C may include all or part of the components of the system described below with respect to FIG. 9.

Server 110 may provide a system for training and building a compressed CNN model using training data, where the trained CNN model may be deployed to computing device 120 and/or any of electronic devices 140A-140C. For example, server 110 may train and build a compressed CNN model and deploy the model by transferring the model configuration and parameters for execution by a computing platform. Server 110 may deploy the model to electronic device 140A directly connected to server 110, to electronic device 140B via network 130, and/or to computing device 120 via network 130. Computing device 120 may subsequently deploy the model to electronic device 140C in communication with computing device 120. Deployment of a trained compressed CNN model is not limited to the foregoing arrangements and may utilize other mechanisms.

Figure 2:
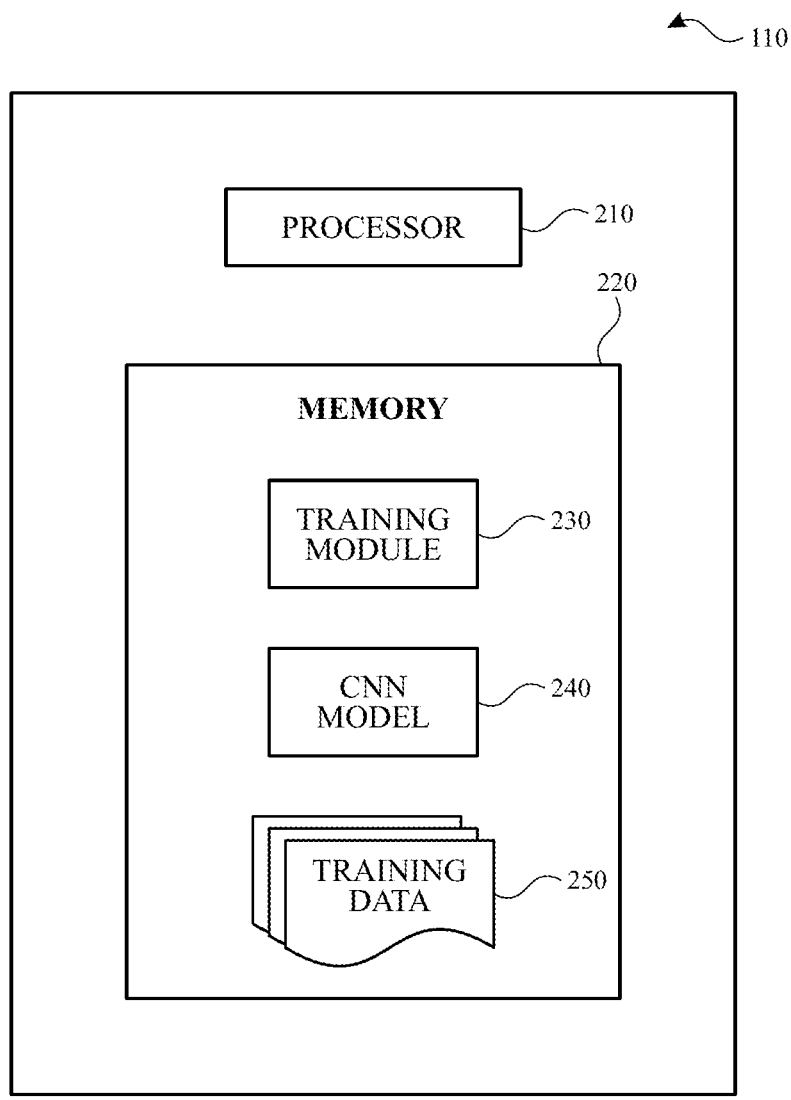
FIG. 2 illustrates an example computing architecture for a system providing an adaptive loss function for machine learning models, in accordance with one or more implementations.

FIG. 2 is a block diagram illustrating components of server 110 used in training and building compressed CNN models for deployment. While the components are being described as being part of server 110, the components may be implemented on other systems such as computing device 120. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, server 110 includes processor 210 and memory 220. Examples of processor 210 and memory 220 are provided below in connection with FIG. 11. Memory 220 may contain training module 230, CNN model 240, and training data 250. Training module 230 represents one or more sets of instructions executable by processor 210 to implement the processes described herein. For example, processor 210 may execute training module 230 to train and compress CNN model 240 using training data 250.

Figure 3:
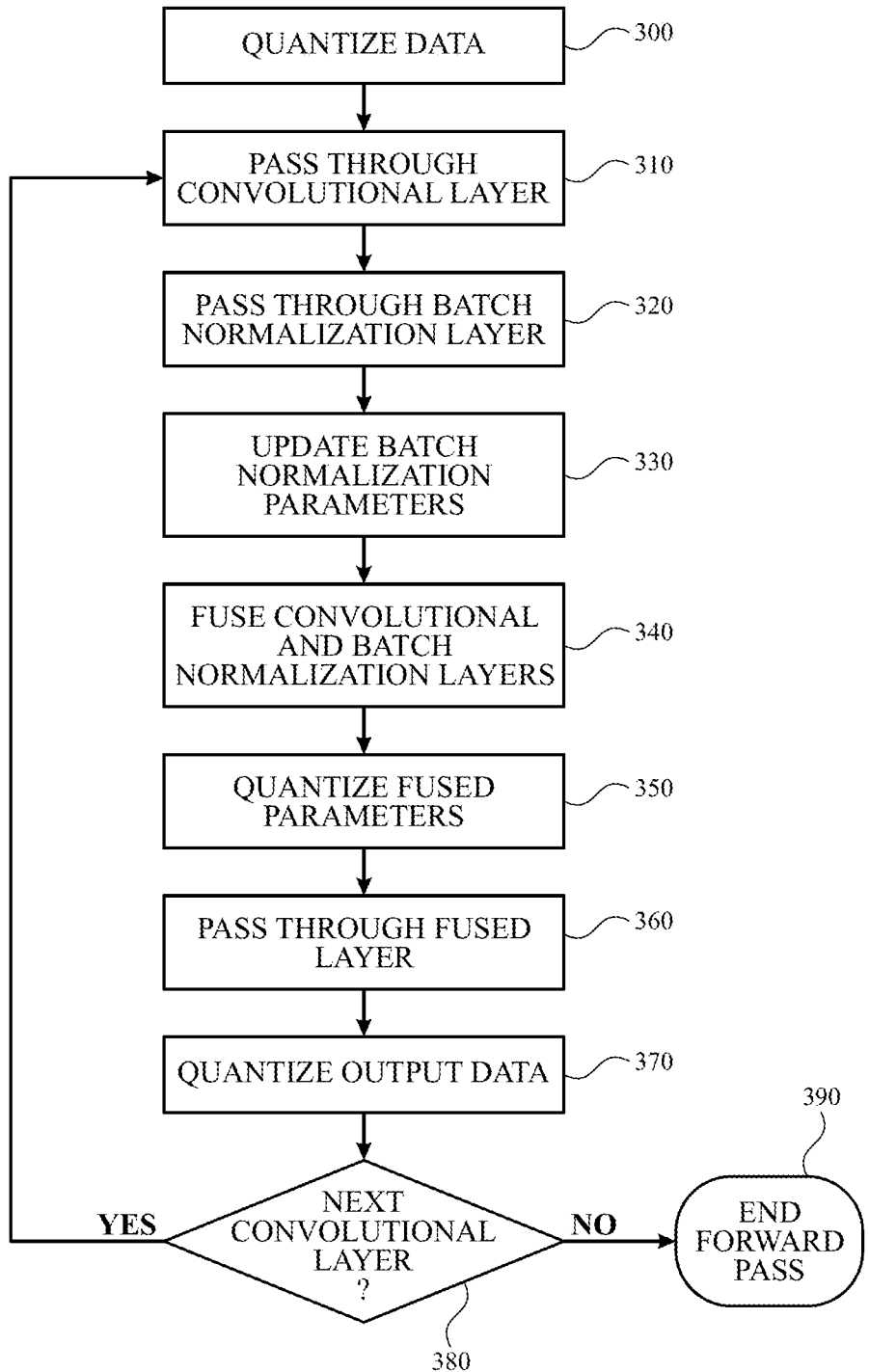
FIG. 3 is a flowchart illustrating a process for training a convolutional neural network model according to aspects of the subject technology.

FIG. 3 is a flowchart illustrating a process for training a convolutional neural network model according to aspects of the subject technology. For explanatory purposes, the blocks of the process are described herein as occurring in serial, or linearly. However, multiple blocks of the process may occur in parallel. In addition, the blocks of the process need not be performed in the order shown and/or one or more blocks of the process need not be performed and/or can be replaced by other operations.

The process illustrated in FIG. 3 begins with quantizing the training data to be used in training the CNN model (block 300). The computing platform on which a trained CNN model will be deployed may have memory bandwidth limitations. For example, an FPGA may have a relatively small total memory capacity and the individual memory units may not be large enough to contain a floating point number. In addition, the FPGA may not include any floating point modules configured to perform floating point operations. To accommodate the memory and processing limitations of the FPGA, input or training data may be quantized such that a 32-bit floating point number, for example, is quantized to an 8-bit fixed point number to align with an 8-bit wide memory of the FPGA and not require floating point operations in the trained model. This conversion represents just one example as other sizes of floating point numbers and fixed point numbers may be used within the subject technology.

The subject technology is not limited to any particular quantization method. According to one example, the computing system may first identify the largest input value and a median value of the input data and determine a range accordingly based on how many bits for a fixed-point number an FPGA allows. In particular, the computing system may take into account the memory limit of the FPGA, which may determine the number of bits allowed for operations and the number of bits allowed in the output. As an example and not by way of limitation, for a 3-bit fixed-point number with the first bit indicating positive or negative, there are eight possible potential values given the largest input value. The computing system may then put an imaginary decimal point called a Radix point into the range. The Radix point may determine which bits of the number are calculated for integer part of the number and which bits of the number are calculated for the fractional part. Then the computing system may estimate or quantize the number based on the available fixed-point representations. The position of the Radix point may change during the training because the largest input value or the median value can change. Once the fixed-point number is determined, the number can be treated as an integer number and integer operations can be performed on it with appropriate adjustments to position of the Radix point in the output. In this way, floating point operations can be removed from the CNN model.

Figure 4:
FIG. 4 illustrates examples of fixed point number quantization.
Figure 4:
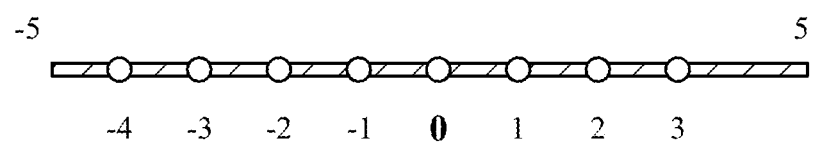
Figure 4:
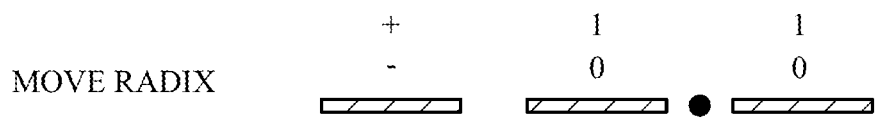
Figure 4:
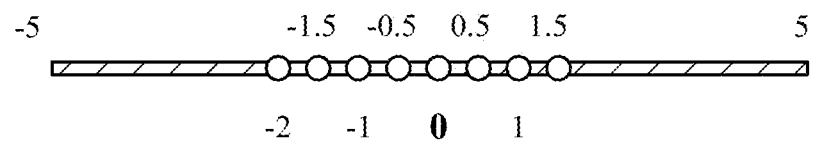

FIG. 4 illustrates examples of fixed point number quantization. For purposes of this figure, assume that the system has determined that the bit-size for the fixed point number format to be used for a particular computing platform is three bits. Given three bits, there may be a maximum of eight numbers or states. A CNN model may need both positive and negative numbers to function properly. As a result, one bit may be used for a sign and the remaining two bits may be number bits. The Radix point may determine which bits of the number are devoted to integer part of the number and which bits of the number are devoted to the fractional part. In the first example of FIG. 4, all of the bits are devoted to the integer part, which may cover a range of all the integers between −4 and 3. In the second example of FIG. 4, the Radix point is moved such that everything on the left side of the Radix point represents a positive power of 2 and everything on the right side is a negative power of 2. Accordingly, the available range changes to −2 to 1.5 with steps of 0.5. With this new range, there is less space between the available points but the points cover a smaller range. The position of the Radix point may be determined by the size of the input. The larger the input number is, the wider this range is. The smaller the input number is, potentially the less quantization error may occur. Every number moving through the quantization is set to a nearby fixed-point value using a set of rules. As an example and not by way of limitation, the rules may be based on mathematical functions comprising one or more of floor($\cdot$), sign($\cdot$), ceiling($\cdot$), or round($\cdot$).

Figure 5:
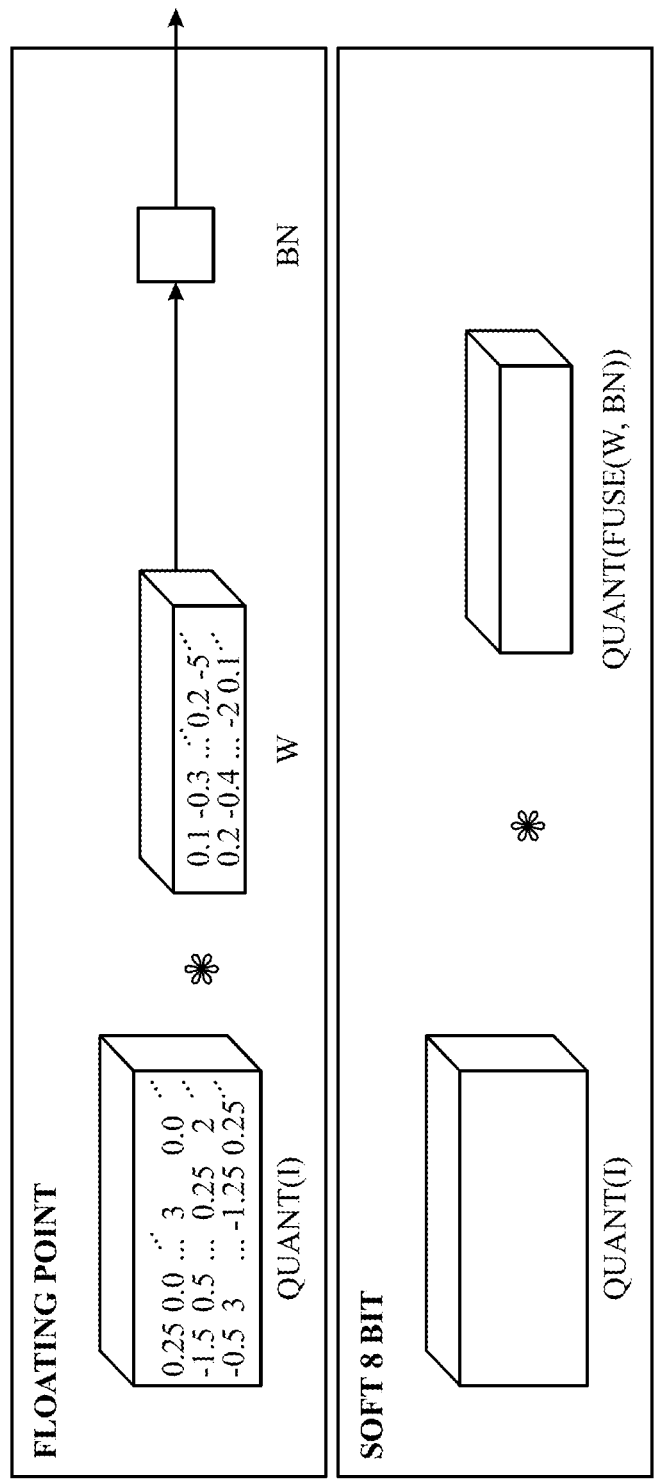
FIG. 5 illustrates aspects of a training pass through a convolutional layer according to aspects of the subject technology.

Returning to FIG. 3, the process proceeds to pass the quantized training data through the first convolutional layer of the CNN model being trained (block 310) followed by passing the convolutional results through a batch normalization layer (block 320) to update normalization parameters of the batch normalization layer (block 330). This first pass of the training process is illustrated in FIG. 5. As shown in FIG. 5, the quantized training data, quant(I), is passed through a convolution layer having weights W. In this first pass, the weights W may remain in a floating point number format and floating point operations may be used to perform the convolutional layer functions. The convolution results are then passed through batch normalization layer BN to update the normalization parameters of BN. Like the convolutional layer in this first pass, the batch normalization layer also uses parameters in floating point number format and processes using floating point operations. In this manner, the normalization parameters are updated during this forward pass using the floating-point numbers and operations.

Unlike conventional training processes which would pass the normalized output data onto the next layer in the CNN model, the subject technology discards the normalized output data at this stage of the process and fuses the convolutional layer and the updated batch normalization layer (block 340) in preparation for a pass of the quantized training data through the fused layers (block 360).

As with input data, the memory and hardware limitations of the computing platform on which the trained CNN model will be deployed may limit the size and format of the weights and parameters used in the layers of the CNN model. Accordingly, the weights and parameters may be quantized into fixed point number formats with bit sizes that are compatible with the hardware of the computing platform. The fixed point number format and bit size may be the same as that used to quantize the input training data or the weights and parameters may use a different fixed point number format and bit size than that used to quantize the input training data. For example, 8-bit fixed point numbers may be used for the input training data and a smaller bit sized (e.g., 4, 3, 2, 1) may be used for the weights and parameters. The bit-size selection represents a tradeoff between speed and accuracy. The smaller the bit size used for the weights and/or parameters, the faster and more power efficiently the operations within a layer may be performed. However, quantizing using smaller bit size fixed point numbers reduces the accuracy of the quantization. Larger, more stable layers may be more tolerant to using lower bit-size fixed point numbers for quantization of the weights and parameters.

Figure 6:
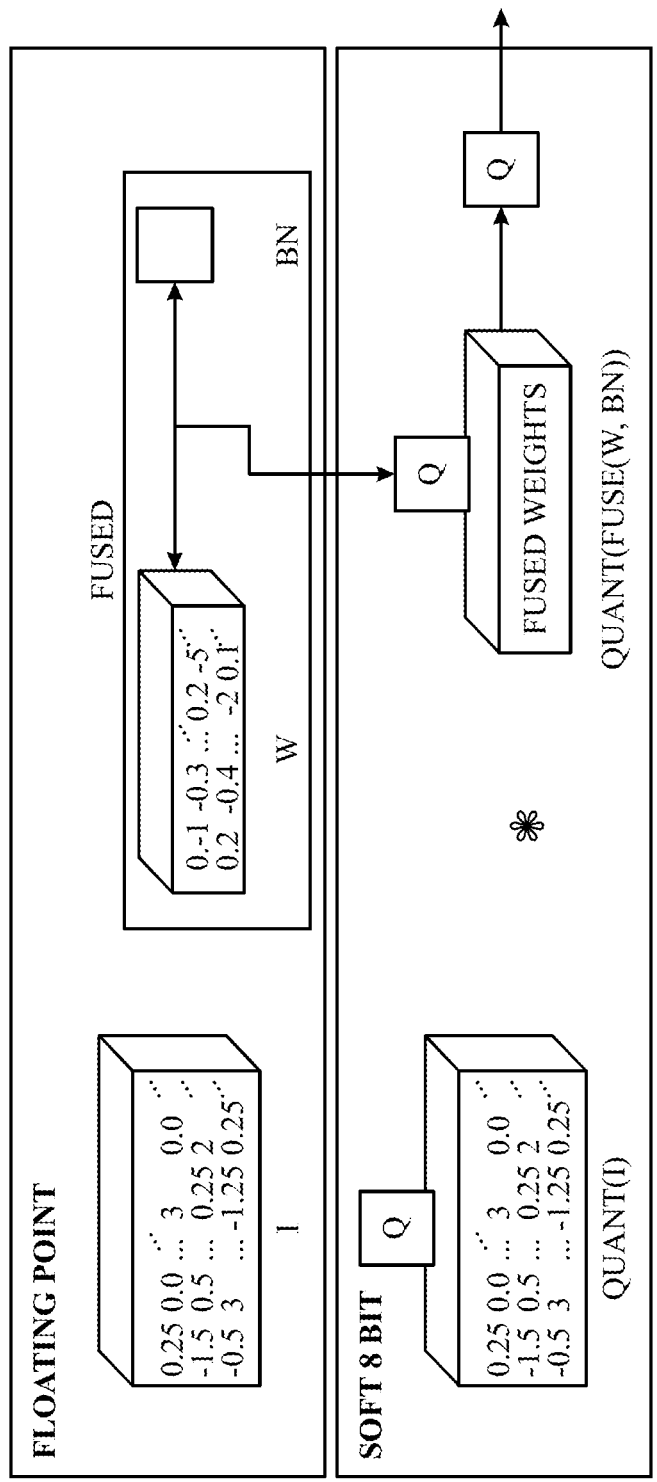
FIG. 6 illustrates aspects of a training pass through a convolutional layer according to aspects of the subject technology.

As illustrated in FIG. 6, the convolutional layer and the batch normalization layer are fused into a fused layer shown as fuse(W, BN). The weights and parameters of the fused layer are quantized shown as quant(fuse(W, BN)). The quantized training data that was passed through the convolutional layer (block 310) and the batch normalization layer (block 320) is passed through the fused layer to generate fused results (block 360) in a second forward pass of the training iteration. The fused layer combined with the quantized weights and parameters simplifies the processing associated with the layer processes. As the operations associated with the fused layer may produce results that are not in line with the fixed point number used to quantize the input data, the fused results are quantized in preparation for the next layer or conclusion of the training process (block 370). The bit size of the fixed point number format used for quantizing the input data and the fused results may be the same size. In this arrangement, the bit size of the fixed number format used for the data in each of the layers in the CNN model may be the same. In some aspects of the subject technology, a subsequent layer may use a different bit size fixed point number format for quantizing the data. The different quantization may be performed on the output data of a preceding layer in the CNN model, or may be performed on the input data received by the layer using a different bit size fixed point number format.

The training process continues where the system determines if there is another convolutional layer in the CNN model being trained (block 380). If another convolutional layer is in the CNN model, the process restarts with passing the quantized output data from the previous layer through the convolutional layer of the current layer (block 310). If there are no remaining layers in the CNN model for this training iteration, the forward pass of the iteration ends (block 390). Once the forward pass of the iteration has completed, the process calculates the gradients associated with the loss function being used for training and performs back propagation through the CNN model to update the weights and parameters. The back propagation through the fused layers may be inferred from the forward pass and briefly include passing the gradients through the fused layer first followed by passing the gradients through the unfused batch normalization layer and convolutional layer to update the weights and parameters associated with those layers.

While the foregoing description has focused on convolutional layers and batch normalization layers, the CNN model being trained may include other types of layers through which the training data would be pass during each training iteration. As needed, the results generated from these other types of layers also may be quantized into fixed point number format prior to passing the results onto the next layer.

Figure 7:
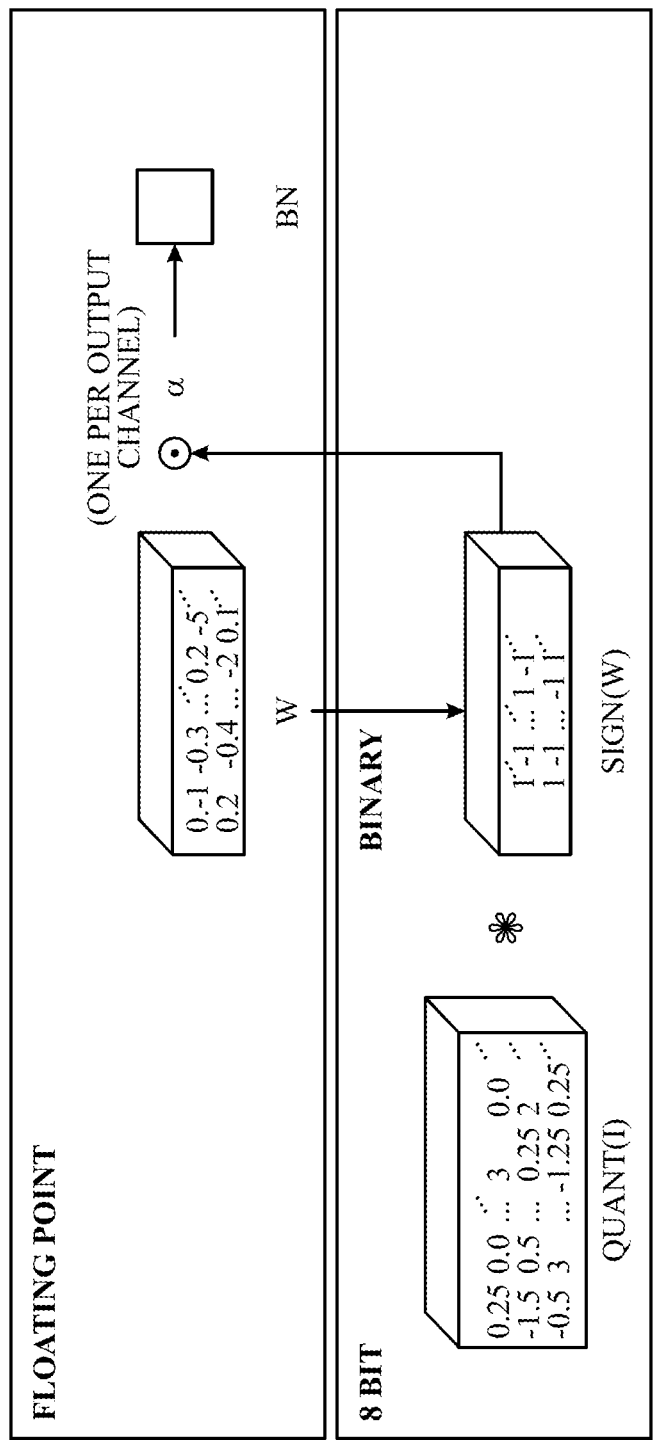
FIG. 7 illustrates aspects of a training pass through a convolutional layer according to aspects of the subject technology.
Figure 8:
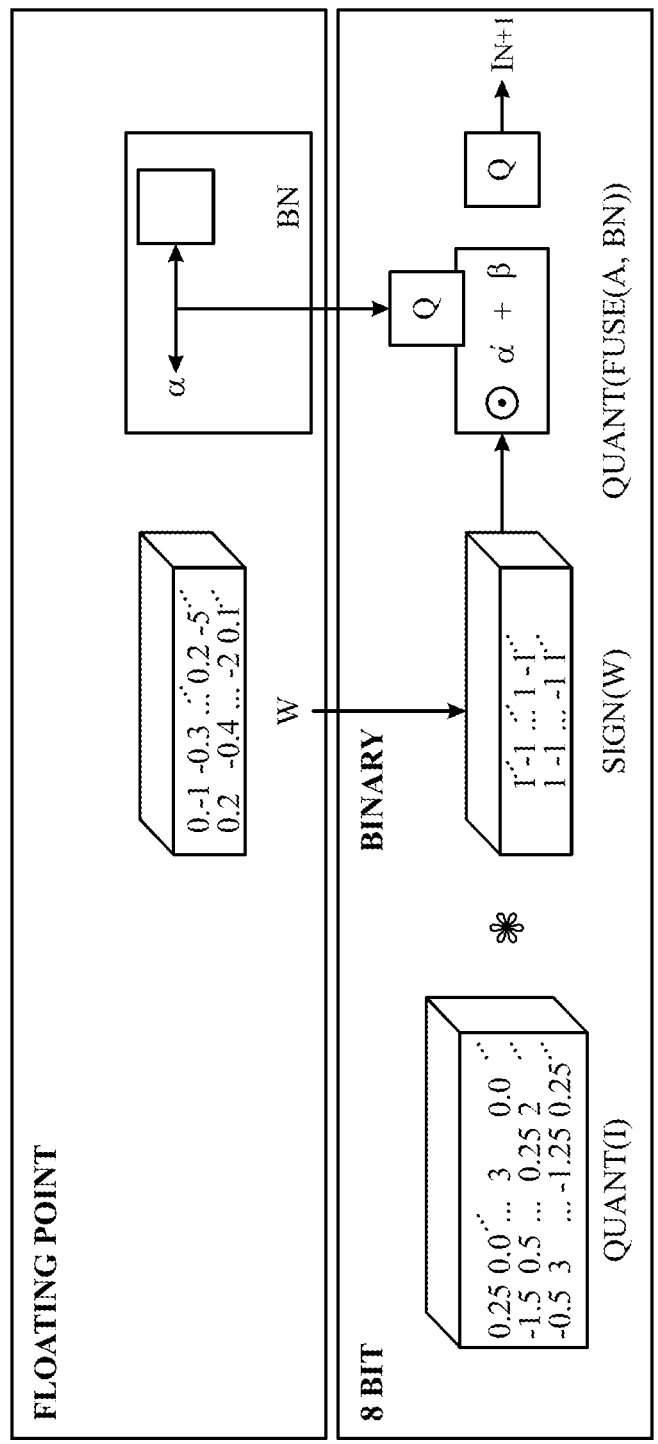
FIG. 8 illustrates aspects of a training pass through a convolutional layer according to aspects of the subject technology.

In lower precision CNN models, where the weights of the layers may be quantized to relatively low bit-size fixed point numbers (e.g., 1-bit, 2-bit), a scaling factor may be added to after the convolutional layer has processed the input data. FIG. 7 illustrates forward pass of quantized training data in which the weights of the convolutional layer are binary and represented as sign(W) in the figure. The scaling factor is represented by α in the figure and is applied to the convolution results prior to batch normalization. As with the examples, above, this first pass may be used to update the batch normalization parameters using floating-point operations. During the next pass illustrated in FIG. 8, the scaling factor and the batch normalization are fused and quantized, represented as quant(fuse(a, bn)) in the figure. The fused operation on the convolution results then uses multiplication operations on quantized α' added to parameters β determined during the fusing process. The result of the fused operation may further be quantized in preparation for the next layer.

Training iterations continue on the CNN model until a desired accuracy is reached. The trained model will include the fused convolutional and batch normalization layers together with quantization of input data and quantized weights and parameters associated with the different layers of the trained CNN model. In addition, the trained model will include metadata describing how each set of parameters is quantized such as by indicating the radix location for each parameter set, for example. The quantization and layer fusion removes the use of floating point operations in the trained CNN model and simplifies other operations. Accordingly, the trained CNN model may be compatible with computing platforms such as an FPGA that may have limited memory architectures, limited operation modules, and/or limited power availability. The trained CNN model may then be deployed on computing platforms of various types of electronic devices.

Figure 9:
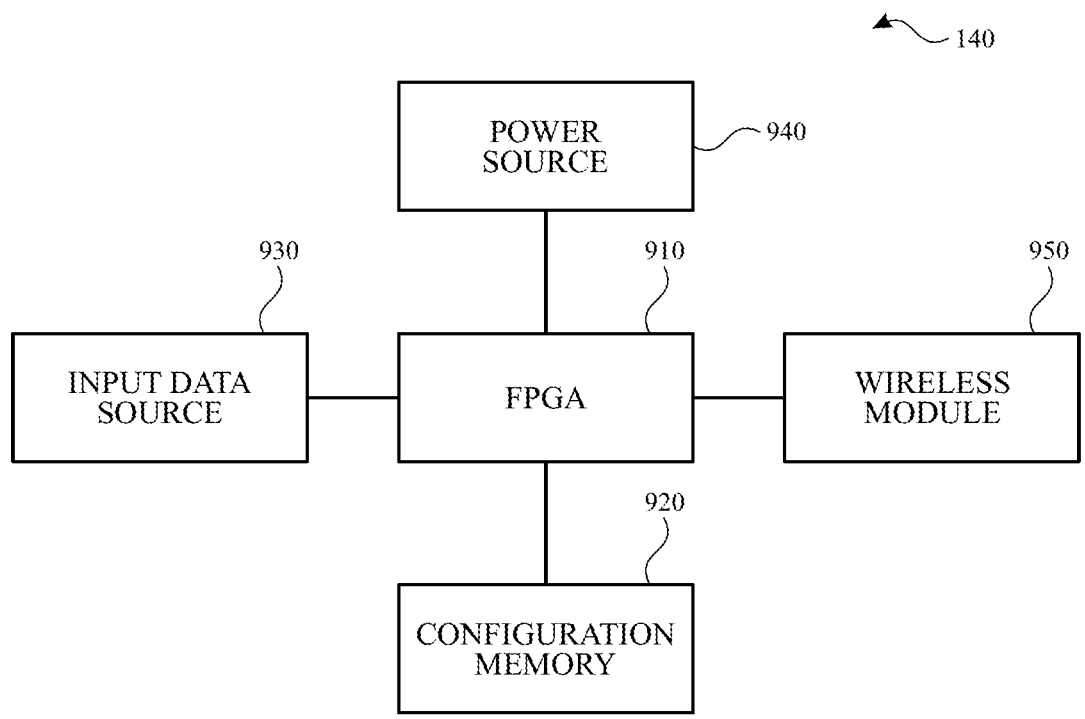
FIG. 9 is a block diagram illustrating components of an electronic device according to aspects of the subject technology.

FIG. 9 is a block diagram illustrated components of an electronic device 140 according to aspects of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated in FIG. 9, electronic device 140 includes FPGA 910, configuration memory 920, input data source 930, power source 940, and wireless module 950. FPGA 910 represents one example of a computing platform on which a trained CNN model can be deployed. The subject technology is not limited to using an FPGA. Other computing platforms such as application-specific integrated circuits or other types of programmable logic devices may be used in place of or together with an FPGA. Configuration memory 920 represents a non-volatile memory device containing configuration data for the CNN model deployed on FPGA 920 and may contain configuration data other components of electronic device 140. Configuration data may include the quantized weights and other parameters associated with the various layers of the trained CNN model. FPGA 910 may be configured to store the configuration data instead of configuration memory 920. Accordingly, configuration memory may not be needed.

Input data source 930 represents the source of input data passed through the trained CNN model deployed on FPGA 910. Input data source 930 may include a sensor, such as a camera or microphone, or may be just a buffer of input data captured by electronic device 140 from another data source. The subject technology is not limited to any particular type or number of sensors that may be used as an input data source.

Power source 940 represents a source of power used to operate the trained CNN model deployed on FPGA 910. Power source 940 may include a hardwired connection to an external power source. Alternatively, power source 940 may include an energy generator and harvester to allow electronic device 140 to be self-sufficient for power. The energy generator and harvester may include a photovoltaic cell, piezoelectric components, thermoelectric generators and may harvest energy from ambient electromagnetic energy, kinetic energy of wind/waves, or other sources of energy found in a particular environment. The harvested energy may be stored in a battery or capacitor, such as a supercapacitor. A DC-DC converter may be used to enable the supercapacitor to discharge constant voltage, current, or power for a period of time to allow electronic device 140 to operate.

Wireless module 950 represents hardware, firmware, and/or software configured to enable electronic device 140 to transmit data to or received data from external systems. Wireless module 950 is not limited to any particular communication standard/protocol. For example, wireless module 950 may utilized Bluetooth, Low Energy Bluetooth, 802.11x Wi-Fi, low-power wide-area network protocols (LPWAN) such as LoRa. Wireless module 950 may be configured to allow electronic device 140 to receive input data for processing with the deployed trained CNN model, receive updates to the weights and/or parameters of the trained CNN model, or even receive an updated trained CNN model for deployment on FPGA 910.

Figure 10:
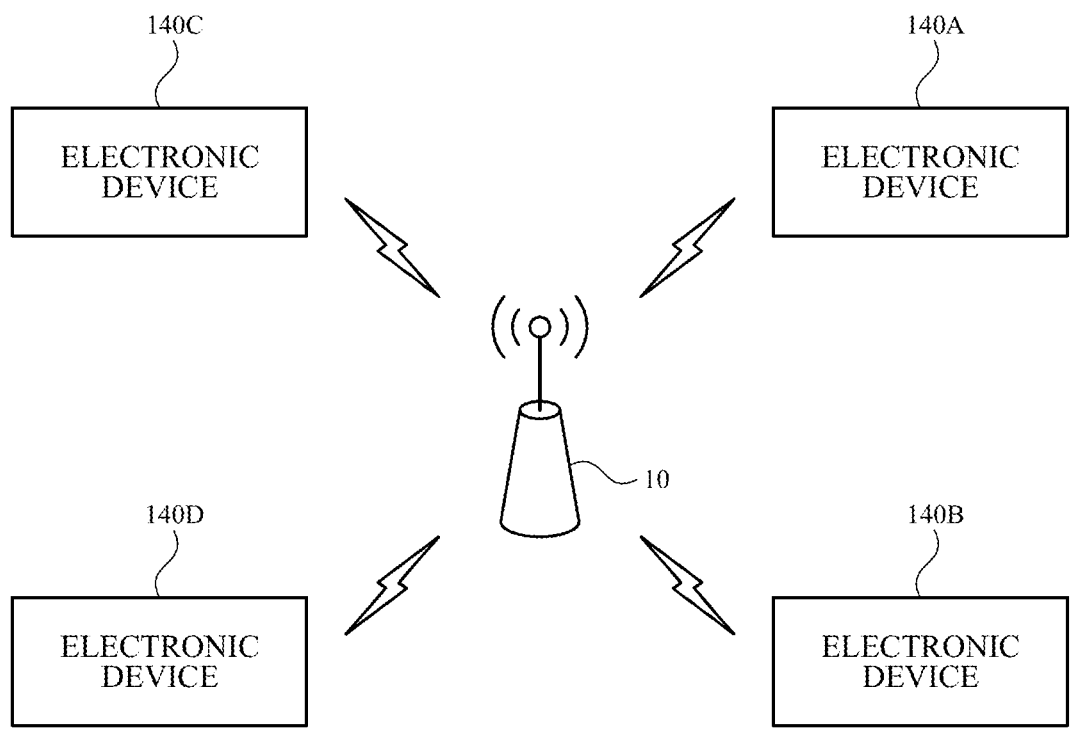
FIG. 10 is a diagram illustrating a networking environment according to aspects of the subject technology.

FIG. 10 is a diagram illustrating a network environment in which multiple electronic devices 140A-140D are in communication with base station 10. Low-power/low-data rate wireless communication modules specifically designed for IoT may be integrated into wireless module 950 within each of electronic devices 140A-140D. For example, LoRa may enable communication with external devices and systems at a very small power overhead. A variety of other low-power/low-data rate wireless communication modules already existing in the market may be integrated as well. These low-power wireless communication modules may provide up to tens of kilometers of range and tens of kilobits per second. Based station 10 may be in communication with each of electronic devices 140A-140D to provide connectivity over a large area. Base station 10 may be connected to the internet and may access the internet using a backend software running on a laptop, PC, or mobile application connected in communication with base station 10. Electronic devices 140A-140D may be assigned a unique ID during manufacturing, enabling the devices to be uniquely queried through backend software and to form a network with base station 10 using the unique IDs. The backend software may command the devices to provide information, such as objects classified, to authorized users. The devices may also leverage these communication modules to send certain information to the base station, e.g., traffic information extracted from monitoring the streets. Base station 10 may act as a relay to exchange information between different devices, which information may be used to find correlations in the information sent from the different devices.

Wireless module 950 may be configured to allow electronic device 140 to exchange detection, classification, identification, and other information between devices and the outside world. Wireless module 950 also may be used to update the CNN model and inference engine running on electronic device 140. The base station may command a particular electronic device, using the device's unique ID and a predefined command, to put the device in a mode that is ready to receive a new model/inference engine from the base station. Once the device is updated, the device may execute the new model/inference engine next time it is initialized. Such updates may be periodically pushed out to electronic devices 140A-140B from base station 10 and may be automatically applied upon device restart. Notifications regarding availability of such updates may be sent to a user for manual deployment to one or more devices. In many use cases, a user might need to update the model over time or a new update on an old model becomes available which should be easily ported into the device, this feature enables those use cases.

In addition to deploying new CNN models, the model may be tuned after deployment. For example, when the model is used for face identification, new faces may need to be registered, requiring the model to be tuned to detect the new faces after deployment. This requires the CNN output structure to be changed to include a signature matching feature.

Standard object detection detects and localizes objects in each frame independently and may not detect the trajectory of the movement of the target objects. Tracking enables detecting and monitoring of the trajectory of the movement of the target objects. To add the tracking feature and capturing of temporal information, the CNN model may be modified to support a multi-input (or frame) or recurrent network structure. In a multi-camera or multi-sensor scenario, long trajectories in a wide environment may be captured using multiple cameras or sensors in a network. The CNN model may be modified to receive input from other cameras or sensors in the network to compare the object signatures for building a long-term trajectory. Object signatures may be generated by a CNN and passed along throughout the network.

Image classification and processing are commonly performed using CNN models. CNN models also may be trained to operate in different domains outside of the visual domain. For example, detecting sounds and understanding speech may be performed by training the CNN model to process sound and speech data. Audio data and image data may be processed in the same pipeline.

A trained CNN model may be represented using a hardware description language such as Verilog or VHDL. This representation allows the trained CNN model to be ported into different types of hardware because the representation may not include any intrinsic or peripheral aspects of an FPGA into which the model may have been originally intended for deployment. If there is a need for more throughout, the trained CNN model may be ported into an FPGA with high performance with near to zero development overhead.

Designing an ASIC typically includes doing a proof of concept on an FPGA. Migrating from an FPGA to an ASIC may be achieved by using pre-existing automated tools. A camera module may be integrated into a CNN inference engine that is implemented on an ASIC using standard camera IP cores (e.g., those provided by the Image Sensor IC foundries). An energy harvester and wireless communication module may also be integrated into the CNN inference engine implemented on an ASIC. Implementing a CNN inference engine on an ASIC may reduce the size of the devices/systems, reduce the cost of manufacturing, and enable the production to be scaled. Implementations may be embedded into variety of environments (e.g., asphalt) due to the reduced size of devices/systems. Implementing a CNN inference engine on an ASIC may also provide the devices/systems with better power and performance efficiency. Implementing a CNN inference engine on an ASIC may also enable low-power disposable AI solutions, high throughput, and/or small footprint smart devices. Implementing a CNN inference engine on an ASIC may also enable sufficient energy to be harvested from electromagnetic waves because ASIC-based system may provide improved power consumption efficiency (compared to FPGA-based system) and because the communication antenna (e.g., small flexible antenna) may serve the purpose of harvesting energy from electromagnetic waves in addition to basic communications transmissions.

The foregoing features and functionality provide a wide range of possible use cases for different configurations of electronic devices deployed CNN models trained and compressed as discussed above. For example, remote infrastructure monitoring, including, but not limited to, National Park monitoring, wildlife monitoring, agricultural monitoring for pastured animals, illegal logging (protected forest) monitoring, flash flood early warning system, sides and bottoms of bridges, train switches, pipelines, oil/gas wells, etc. Power infrastructure may not be available in many the locations where such monitoring may be desired. Aspects of the subject technology may provide a solution because they can harvest energy from ambient sources enabling the electronic devices to be deployed in remote areas with no infrastructure. A user may wirelessly send a query to an electronic device get a response back from the device when the device has harvested enough energy to operate. The response from the device may contain analyzed and inferred information about the data generated by its camera, for example, it may provide the information: "two deer just passed".

Aspects of the subject technology may make allow the electronic devices with the deployed CNN model to be installed on a light pole, signpost, telephone pole or other locations without using hardwired connections. Relatively low costs and ease of installation may allow large numbers of devices to be installed for purposes of traffic measurement, flash crowd detection, anomaly detection (e.g., explosion, fire), etc. ASIC implementations may provide a small form factor which enables it to be embedded into different materials, for example, it can be embedded into asphalt to monitor the condition of the roads. Particular implementations may also be installed on bikes involved in bike sharing programs, which may provide information about bike flow and traffic in the bike trails and enable maps to provide a better estimation of the usage of the bike lanes.

The CNN model deployed on the electronic device may provide for detection of pedestrians and/or vehicles (e.g., bicycles, scooters, cars, trucks, buses, boats) using battery-free devices to reduce infrastructure. Such electronic devices may be battery-free and may leverage low-power wireless communication modules (e.g., LoRa) to connect these devices together. The devices may continue to operate even when there is no light available by using a battery or a large supercapacitor instead of a small super capacitor. The benefit of using a small supercapacitor comes from eliminating the need for a charge monitoring system. The size of the supercapacitor and its voltage level may be adjusted such that one full charge can provide just enough energy for one inference. For instances where ambient energy is not available (e.g., at night in a solar power scenario), a battery or a large supercapacitor may be used in conjunction with an energy monitoring circuit to supply power to the device/system. In particular embodiments, the energy monitoring circuit may store energy saved during the day time by slowing down the device and the stored energy may be used to supply power to the device during the night time.

The CNN model deployed on the electronic device may be trained to detect animals or other hazards close to the road, and sending the information to navigation software to warn drivers. Battery-free AI-enabled devices disclosed herein may be deployed in remote roads and low-power wireless communication modules may send information about the remote roads to a base station. The base station may be plugged in to a power grid and may also be connected to the internet. Using the base station as a relay, information about the road may be sent to navigation providers and used to provide navigation services. For example, the information provided to the navigation providers may be used to inform the drivers in advance about the dangers they might face in the road ahead of them. In particular embodiments, a multi camera tracking feature may be used to track the flow of animals (or any other hazard) to provide drivers with danger warnings.

Retail business owners may deploy smart devices disclosed herein throughout stores, warehouses, etc. to get live and insightful information about different metrics. Particular configurations disclosed herein may be reconfigurable, enabling a user to leverage the device's low-power wireless module to update the model that is running on the device. For example, if a business owner wants to understand how many people are in a particular aisle in a store, a device can be loaded with a person detector model. If the business owner wants to know which products shoppers pay attention to, the business owner can load the device with a gaze/head tracker model. Multiple models may be combined into one model. For example, a gaze tracker and a person tracker can be bundled into one model loaded to the device such that the information sent back to the user includes both the number of people in an area of coverage and where they were looking at. Business owners will be able to first deploy the devices, then figure out what model to load onto the devices. The business owners may even decide to change the model later if they decide that that they need different information from the devices.

Electronic devices with trained CNN models may be deployed with cameras in a parking lot to monitor occupancy of individual parking spots to enable data for very accurate parking availability to the customers. Using the information of the specific available parking spots, a system can assign you an open spot, navigate you to the spot, and verify the license plate to make sure the car was parked in the assigned spot. Based on the lighting condition of a parking lot and the required frame rate of the smart parking spot occupancy detector, size of a solar cell to be included on each device can be determined. Cameras may be mounted such that all of the spots are covered, and spots are clearly marked with a spot number. Also, a base station may be deployed for the entire parking lot that listens to packets received from the devices. Each camera, when energized about the availability of the spots, may send to a base station a packet of information containing a spot number followed by one bit indicating if it is open (1) or occupied (0) using the low-power IoT communication module (e.g., LoRa). On the back-end, the base station may update a database to include all of the spots indicating whether the spot is available. Implementing the embodiments on an ASIC may provide further ease of device deployment and embedment.

An ASIC version of a battery-free AI camera may be implemented on a credit card. The credit card owner's face identification model may be loaded to an ASIC-based system in the credit card. When a user taps the credit card for payment, a camera may harvest energy from NFC and authorize the transaction if the credit card owner's face was in view, otherwise the transaction will be canceled. Such devices can harvest energy from the NFC signal in the same way that NFC-enabled credit cards use the NFC signal to power their chip and authorize a payment (using a coil antenna to absorb magnetic field generated by NFC signal and harvesting energy from that). For example, an NFC signal may first power a device embedded in the credit card. After the device is powered up, it may capture an image using the low-power integrated camera. Then, the device may identify the faces in the picture it gets. If an authorized user's face is in view, the device may authorize the transaction. Privacy is preserved because the computation/identification happens on the device without the captured image leaving the device.

Aspects of the subject technology may be used for low-power/battery-free and accurate gating modules for high power/high resolution video streaming systems. To give an example, a doorbell camera may be augmented with a battery-free camera which with high precision and high recall prevents the high resolution streaming system from turning on by rejecting uninteresting scenarios that happen in the field of view. An effective gating modality should consume significantly less power than a primary system. Depending on the application, the rejection cases might be different. For example, in one application, a user might only be interested in gating the high-resolution sensor when a human is in view. On the other hand, another application may require a high-resolution camera to start streaming when a pet is in the field of view. The subject technology enables this use case through changing/updating the model/inference engine using the low-power wireless communication module.

Aspects of the subject technology may be used to implement safety cameras. For example, bikers can wear battery-free cameras and be informed if a potentially dangerous situation is threatening them, i.e., car approaching from a biker's blind spot. The devices may be configured to track objects, thus bike safety cameras built may have a lower false positive. Devices should only warn the biker if there is a vehicle, pedestrian, or other hazards that is approaching the biker, but not necessarily any vehicle or pedestrian that is close by. Also, depending on where this bike camera is used, the model on the device may be modified. For example, mountain bikers may need a model that tracks animals more accurately than vehicles because in the mountains there may be many animals and almost no vehicles. On the other hand, bikers that bike in a city might need to have a model on its device that is designed to detect and track pedestrians, other bikes, or vehicles.

Aspects of the subject technology may be used to implement sensors to be deployed to collect information from areas following a disaster to assist with the recovery process. During disasters, infrastructure may be damaged or even fully destroyed. Large numbers of electronic devices implement the subject technology on an ASIC may be dropped where the disaster occurred. The devices may start sending their extracted information to a base station. Because the communication channel is shared among all of these devices and there are a large number of devices, it is very important to utilize the spectrum efficiently. So, to save bandwidth, the base station can skim through the information it receives from the devices and command those devices that do not provide useful information to be excluded from the network.

Aspects of the subject technology may be implemented to enable a camera to operate in two modes: a) low-power/battery-free with moderate performance (frame rate) or b) mid-power with a very high performance. Mid-power version of these cameras may be used for high performance scenarios such as autonomous vehicles. Efficient Verilog implementation of an inference engine may run at orders of magnitude lower of power consumption per energy/inference compared to other solutions. There are applications that demand a high throughput and low latency computation (e.g., autonomous cars). For high throughput applications, one might think of a cloud connected AI device, but their latency is high. GPUs are devices that both provide high throughput and low latency because they can do many operations at the spot without the need for cloud connectivity. But GPUs burn a significant amount of power. Aspects of the subject technology disclosed herein are implemented in a way that can be easily ported into more powerful FPGAs that provide higher performance by increasing their clock signal. The subject technology may enable portability by using hardware description languages such as Verilog and avoiding any FPGA vendor-specific intrinsics and peripherals. This ensures ease of portability to other FPGAs that are designed for performance rather than power consumption.

Aspects of the subject technology may allow a stand-alone home security camera to wirelessly communicate information to a wireless receiver. The information may characterize what is happening in front of the camera and may not include a video stream from the camera. For example, "a delivery person just dropped a package at the door", or "the cat has left the house" may be communicated to a user based on the output from a trained CNN model deployed with the camera. The communicated information also may include a still image rather than a video stream of the identified event. The CNN model may be updated over the air based on different information human, pose extraction, or pet detection.

Aspects of the subject technology may be implemented by training the CNN model for audio processing to allow a low-power always-on audio recognition system as part of elderly and baby care monitoring, for example. Aspects of the subject technology may include devices that analyze both audio and video as an input and run multiple inference engines at the same time to both track persons that needs care and detect when a person might need help by extracting this information from the audio (e.g., when a person shouts, falls down creating a loud sound, or simply asks for help by saying "help"). After detecting an emergency, the configured electronic devices may use their low-power wireless communication module to communicate the situation to a base station which is then relayed to a user as a form of a notification, email, text, or automated call.

Figure 11:
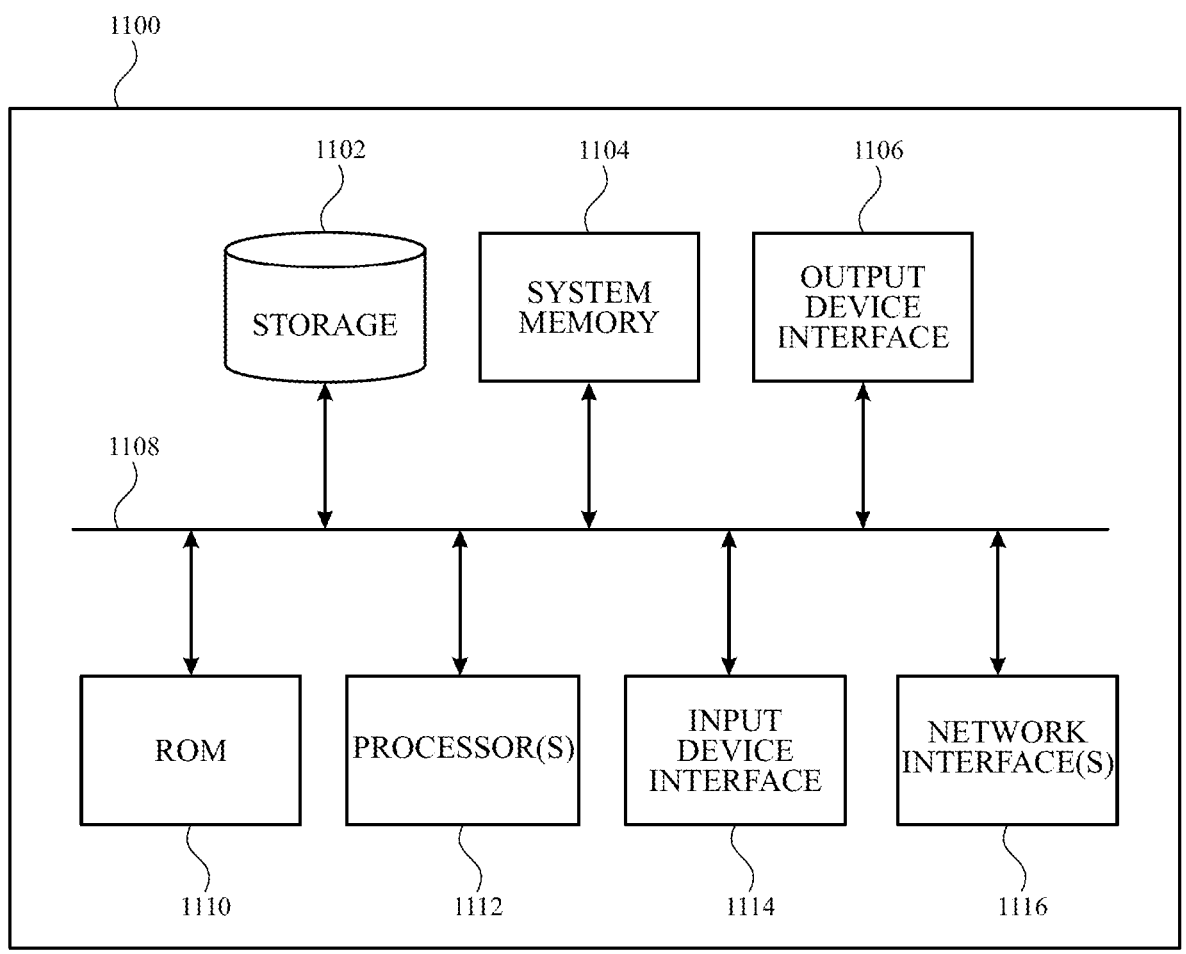
FIG. 11 illustrates an example of a computer system with which aspects of the subject technology may be implemented.

FIG. 11 illustrates an electronic system 1100 with which one or more implementations of the subject technology may be implemented. The electronic system 1100 can be, and/or can be a part of, server 110 and/or computing device 120 shown in FIG. 1. The electronic system 1100 may include various types of computer readable media and interfaces for various other types of computer readable media. The electronic system 1100 includes a bus 1108, one or more processing unit(s) 1112, a system memory 1104 (and/or buffer), a ROM 1110, a permanent storage device 1102, an input device interface 1114, an output device interface 1106, and one or more network interfaces 1116, or subsets and variations thereof.

The bus 1108 collectively represents all system, peripheral, and chipset buses that communicatively connect the numerous internal devices of the electronic system 1100. In one or more implementations, the bus 1108 communicatively connects the one or more processing unit(s) 1112 with the ROM 1110, the system memory 1104, and the permanent storage device 1102. From these various memory units, the one or more processing unit(s) 1112 retrieves instructions to execute and data to process in order to execute the processes of the subject disclosure. The one or more processing unit(s) 1112 can be a single processor or a multi-core processor in different implementations.

The ROM 1110 stores static data and instructions that are needed by the one or more processing unit(s) 1112 and other modules of the electronic system 1100. The permanent storage device 1102, on the other hand, may be a read-and-write memory device. The permanent storage device 1102 may be a non-volatile memory unit that stores instructions and data even when the electronic system 1100 is off. In one or more implementations, a mass-storage device (such as a magnetic or optical disk and its corresponding disk drive) may be used as the permanent storage device 1102.

In one or more implementations, a removable storage device (such as a floppy disk, flash drive, and its corresponding disk drive) may be used as the permanent storage device 1102. Like the permanent storage device 1102, the system memory 1104 may be a read-and-write memory device. However, unlike the permanent storage device 1102, the system memory 1104 may be a volatile read-and-write memory, such as random access memory. The system memory 1104 may store any of the instructions and data that one or more processing unit(s) 1112 may need at runtime. In one or more implementations, the processes of the subject disclosure are stored in the system memory 1104, the permanent storage device 1102, and/or the ROM 1110. From these various memory units, the one or more processing unit(s) 1112 retrieves instructions to execute and data to process in order to execute the processes of one or more implementations.

The bus 1108 also connects to the input and output device interfaces 1114 and 1106. The input device interface 1114 enables a user to communicate information and select commands to the electronic system 1100. Input devices that may be used with the input device interface 1114 may include, for example, alphanumeric keyboards and pointing devices (also called "cursor control devices"). The output device interface 1106 may enable, for example, the display of images generated by electronic system 1100. Output devices that may be used with the output device interface 1106 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 11, the bus 1108 also couples the electronic system 1100 to one or more networks and/or to one or more network nodes, such as the electronic device 110 shown in FIG. 1, through the one or more network interface(s) 1116. In this manner, the electronic system 1100 can be a part of a network of computers (such as a LAN, a wide area network ("WAN"), or an Intranet, or a network of networks, such as the Internet. Any or all components of the electronic system 1100 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

One aspect of the present technology may include the gathering and use of data available from specific and legitimate sources to train neural network models and to apply to trained neural network models deployed in systems. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to train a neural network model to focus on areas that may be of greater interest to the user or applied to trained neural network models deployed in systems to provide inference information to the user in accordance with their preferences. Accordingly, use of such personal information data enables users to have greater control of the delivered content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of training data collection, the present technology can be configured to allow users to select to "opt in" or "opt out" of participation in the collection of personal information data during registration for services or anytime thereafter. In another example, users can select not to provide mood-associated data for use as training data. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, training data can be selected based on aggregated non-personal information data or a bare minimum amount of personal information, such as the content being handled only on the user's device or other non-personal information available to as training data.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
    passing quantized training data through a first convolutional layer of a neural network model to generate first convolutional results during a first iteration of training the neural network model;
    passing the first convolutional results through a first batch normalization layer of the neural network model to update first normalization parameters of the first batch normalization layer;
    fusing the first convolutional layer with the first batch normalization layer to generate a first fused layer;
    quantizing first fused parameters of the first fused layer;
    passing the quantized training data through the first fused layer using the quantized first fused parameters to generate first output data;
    quantizing the first output data; and providing the neural network model to an electronic device as a trained neural network model comprising the first convolutional layer fused with the first batch normalization layer and the quantized first fused parameters for execution by the electronic device.

2. The method of claim 1, further comprising:
passing the quantized first output data through a second convolutional layer of the neural network model to generate second convolutional results during the first iteration of training the neural network model;
passing the second convolutional results through a second batch normalization layer of the neural network model to update second normalization parameters of the second batch normalization layer;
fusing the second convolutional layer with the second batch normalization layer to generate a second fused layer;
quantizing second fused parameters of the second fused layer;
passing the quantized first output data through the second fused layer using the quantized second fused parameters to generate second output data; and
quantizing the second output data.

3. The method of claim 2, wherein the quantized training data is quantized to a first fixed point number format having a first bit size, and wherein the quantized first output data is quantized to a second fixed point number format having a second bit size.

4. The method of claim 3, wherein the first bit size and the second bit size are equal.

5. The method of claim 3, wherein the quantized first fused parameters are quantized to a third fixed point number format having a third bit size.

6. The method of claim 5, wherein the first bit size and the third bit size are different.

7. The method of claim 5, wherein the quantized second fused parameters are quantized to a fourth fixed point number having a fourth bit size.

8. The method of claim 7, wherein the third bit size and the fourth bit size are different.

9. The method of claim 1,
wherein the trained neural network model is provided to a computing platform of the electronic device,
wherein the computing platform comprises a field-programmable gate array or an application-specific integrated circuit.

10. The method of claim 9, wherein the electronic device comprises a power source configured to supply power to the electronic device, a sensor configured to generate input data, and a wireless communications module configured to communicate classification data generated by the computing platform and to receive configuration information for the computing platform.

11. The method of claim 10, wherein the electronic device is assigned an identifier and is configured to communicate with a base station via the wireless communications module using the identifier, and wherein the base station is in communication with one or more other electronic devices.

12. A system comprising:
a processor;
a memory device containing instructions, which when executed by the processor cause the processor to:
pass training data quantized to a first fixed point number format having a first bit size through a first convolutional layer of a neural network model to generate first convolutional results during a first iteration of training the neural network model;
pass the first convolutional results through a first batch normalization layer of the neural network model to update first normalization parameters of the first batch normalization layer;
fuse the first convolutional layer with the first batch normalization layer to generate a first fused layer;
quantize first fused parameters of the first fused layer to a second fixed point number format having a second bit size;
pass the quantized training data through the first fused layer using the quantized first fused parameters to generate first output data;
quantize the first output data to a third fixed point number format having a third bit size; and
provide the neural network model to an electronic device as a trained neural network model comprising the first convolutional layer fused with the first batch normalization layer and the quantized first fused parameters for execution by the electronic device.

13. The system of claim 12, wherein the memory device contains instructions, which when executed by the process further cause the processor to:
pass the quantized first output data through a second convolutional layer of the neural network model to generate second convolutional results during the first iteration of training the neural network model;
pass the second convolutional results through a second batch normalization layer of the neural network model to update second normalization parameters of the second batch normalization layer;
fuse the second convolutional layer with the second batch normalization layer to generate a second fused layer;
quantize second fused parameters of the second fused layer to a fourth fixed point number format having a fourth bit size;
pass the quantized first output data through the second fused layer using the quantized second fused parameters to generate second output data; and
quantize the second output data to a fifth fixed point number format having a fifth bit size.

14. The system of claim 13, wherein the first bit size and the third bit size are equal.

15. The system of claim 13, wherein the first bit size and the second bit size are equal.

16. The system of claim 13, wherein the first bit size and the second bit size are different.

17. A non-transitory computer-readable medium comprising instructions, which when executed by a computing device, cause the computing device to perform operations comprising:
for each of a plurality of convolutional layers of a neural network model during each training iteration of a plurality of training iterations:
passing quantized training data through the convolutional layer of the neural network model to generate convolutional results;
passing the convolutional results through a batch normalization layer of the neural network model to update normalization parameters of the batch normalization layer;
fusing the convolutional layer with the batch normalization layer to generate a fused layer;
quantizing fused parameters of the fused layer;
passing the quantized training data through the fused layer using the quantized fused parameters to generate output data;
quantizing the output data; and providing the neural network model to an electronic device as a trained neural network model comprising the convolutional layer fused with the batch normalization layer and the quantized fused parameters for execution by the electronic device.

18. The non-transitory computer-readable medium of claim 17, wherein the trained neural network model is provided to a computing platform of the electronic device, and wherein the computing platform comprises a field-programmable gate array or an application-specific integrated circuit.

19. The non-transitory computer-readable medium of claim 18, wherein the computing platform comprises the field-programmable gate array.

20. The non-transitory computer-readable medium of claim 18, wherein the computing platform comprises the application-specific integrated circuit.

* * * * *